United States Patent [19]

Crane

[11] Patent Number: 4,821,873
[45] Date of Patent: Apr. 18, 1989

[54] BRAKE SYSTEM

[75] Inventor: Carroll Crane, Shawneetown, Ill.

[73] Assignee: Peabody Coal Company, St. Louis, Mo.

[21] Appl. No.: 37,468

[22] Filed: Apr. 13, 1987

[51] Int. Cl.[4] .............................................. B65G 23/00
[52] U.S. Cl. ...................................... 198/856; 188/75; 188/186
[58] Field of Search .................. 198/855, 856; 188/75, 188/855, 856

[56] References Cited

U.S. PATENT DOCUMENTS

| | | | |
|---|---|---|---|
| 1,858,123 | 5/1932 | Thropp | 188/174 |
| 2,018,319 | 10/1935 | Raymond et al. | 192/2 |
| 2,542,865 | 2/1951 | Fullmer | 188/174 |
| 2,554,235 | 5/1951 | Bell et al. | |
| 3,155,196 | 11/1964 | Foxx | 188/75 |
| 3,386,536 | 6/1968 | Davidson | 188/174 |
| 3,589,504 | 6/1971 | Blough | 198/856 |
| 4,031,987 | 6/1977 | Webb | 188/75 |
| 4,033,434 | 7/1977 | Henrich | 188/75 |
| 4,306,637 | 12/1981 | Keiser et al. | 188/75 X |

FOREIGN PATENT DOCUMENTS

| | | | |
|---|---|---|---|
| 620488 | 5/1961 | Canada | 188/75 |
| 794272 | 1/1981 | U.S.S.R. | 188/186 |

Primary Examiner—Frank E. Werner
Assistant Examiner—Cheryl L. Gastineau
Attorney, Agent, or Firm—Senniger, Powers, Leavitt and Roedel

[57] ABSTRACT

A brake system for braking a shaft of an apparatus subject to runaway to stop runaway. The system comprises a brake drum on the shaft, one or more brake shoe(s) engageable with and disengageable from the drum, and a control member connected to the brake shoe(s) movable in one direction to a first position for applying the brake shoe(s) and in the opposite direction to a second position for releasing the brake shoe(s). The control member is biased to its first position for applying the brake shoe(s), and a torque motor is connected to the control member for moving the control member on energization of the torque motor to the second position and holding it there for release of the brake shoe(s). A device responsive to runaway of the apparatus for de-energizing the torque motor is provided, the control member being released on de-energization of the torque motor for applying the brake shoe(s) to the drum.

10 Claims, 3 Drawing Sheets

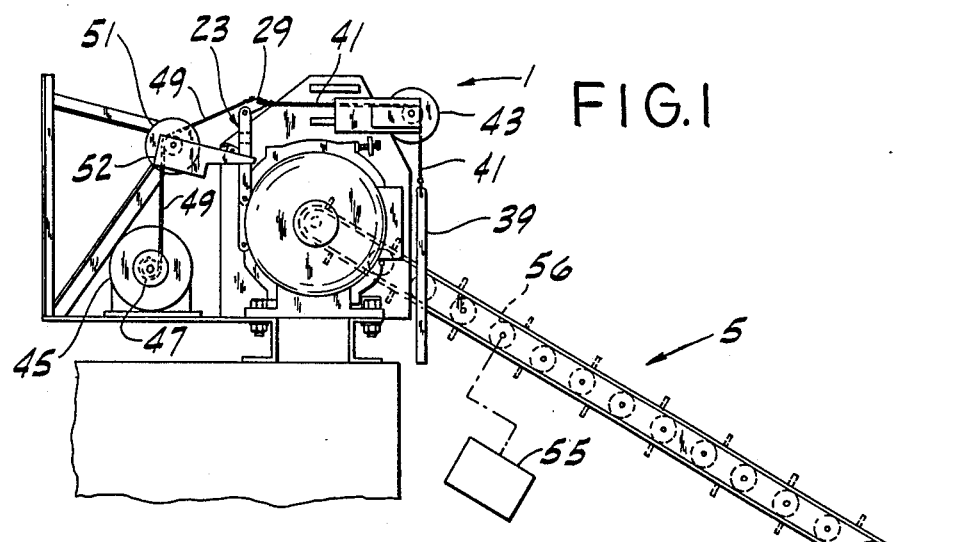
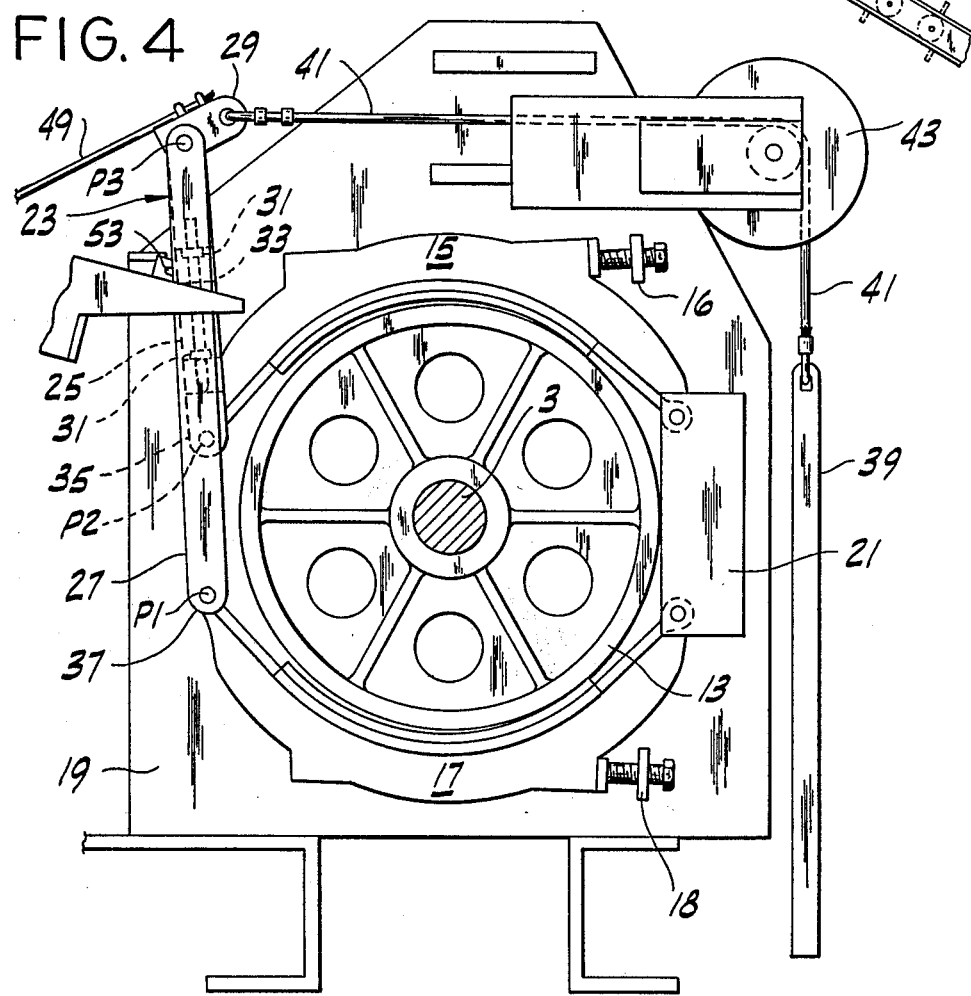

BRAKE SYSTEM

BACKGROUND OF THE INVENTION

This invention relates generally to a brake system, and more particularly to a brake system for braking a shaft of an apparatus subject to runaway to stop runaway.

There is a general need for means for stopping out-of-control or "runaway" apparatus before it causes any injury or damage to itself and/or to its surroundings. This need is particularly compelling with respect to conveyors which are steeply inclined, such as the conveyors used to load coal or ore into barges, since there is a significant risk that these conveyors will run out-of-control due to the large incline and mass of the material being conveyed. Because of the large mass of such material, if the conveyor becomes out-of-control there is least some risk that it will quickly dump so much material that the barge being loaded will be seriously damaged. A resolution of this problem is made especially difficult by the large amount of energy required to stop a runaway conveyor carrying such a large mass of material.

SUMMARY OF THE INVENTION

Among the several objects of the invention may be noted the provision of a brake system for braking a shaft of an apparatus subject to runaway to stop runaway; the provision of such a brake system which is adapted to stop the apparatus in the event of a power failure, the provision of such a brake system which is particularly adapted to stop runaway of heavy-duty apparatus, such as a steeply inclined conveyor used to convey ore to a barge or train car; the provision of such a brake system which is durable and reliable; and the provision of such a brake system which is economical to manufacture and assemble.

Generally, this invention relates to a brake system for braking a shaft of an apparatus subject to runaway to stop runaway. The system comprises a brake drum on the shaft, brake shoe means engageable with and disengageable from the drum, and a control member connected to the brake shoe means movable in one direction to a first position for applying the brake shoe means and in the opposite direction to a second position for releasing the brake shoe means. Means is provided for biasing the control member in one direction to its first position for applying the brake shoe means, and a torque motor is connected to the control member for moving the control member on energization of the torque motor to the second position and holding it there for release of the brake shoe means. Means responsive to runaway of the apparatus for de-energizing the torque motor is provided, the control member being released on de-energization of the torque motor for applying the brake shoe means to its drum.

Other objects and features will be in part apparent and in part pointed out hereinafter.

BRIEF DESCRIPTION OF THE DRAWINGS

FIG. 1 is a side elevation of a brake assembly of the present invention, illustrating its use with a conveyor;

FIG. 4 is a view similar to FIG. 3 showing the control member in a second position.

Corresponding reference characters indicate corresponding parts throughout the several views of the drawings.

DESCRIPTION OF A PREFERRED EMBODIMENT

Figure 2:
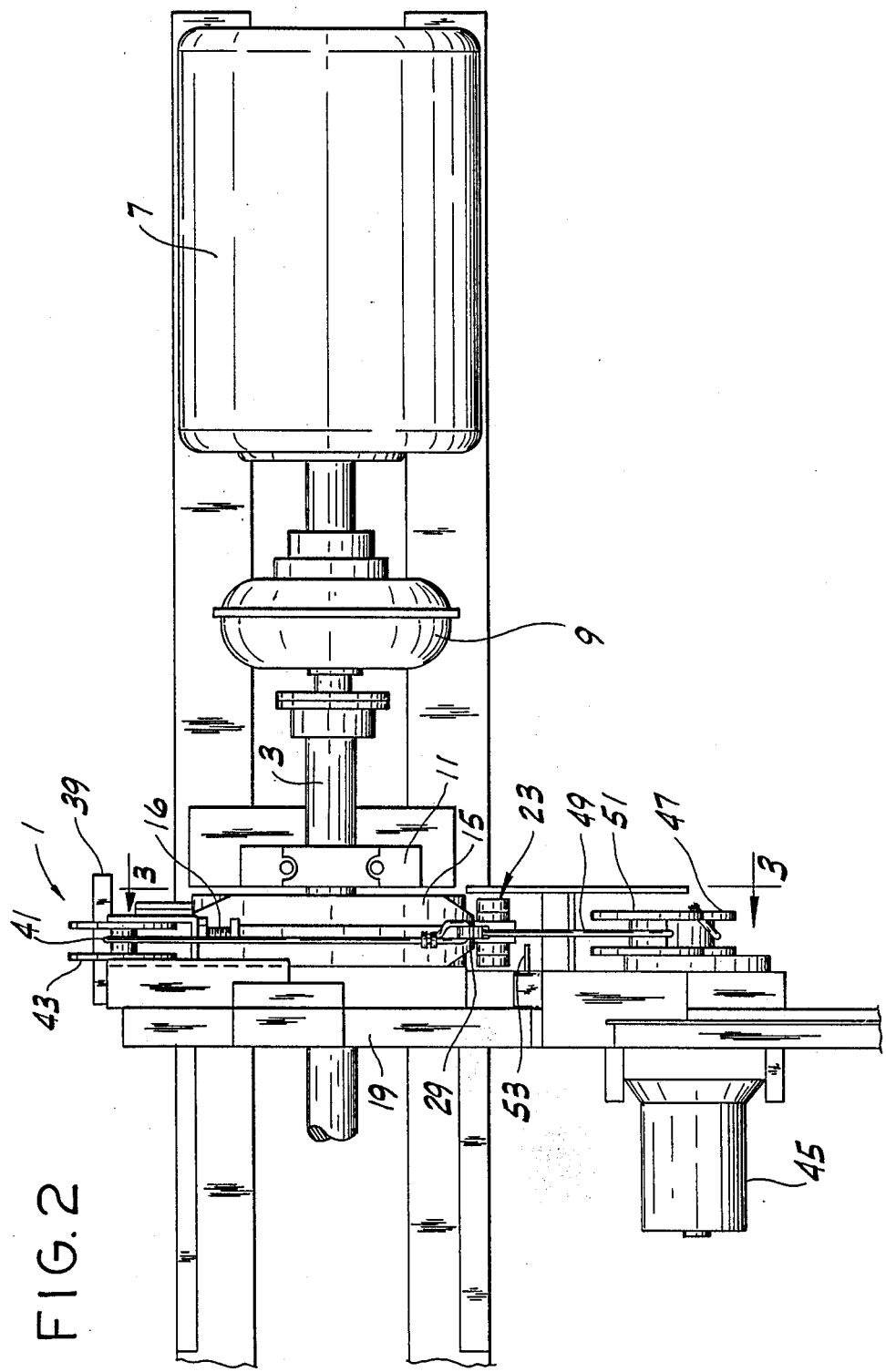
FIG. 2 is a top plan view of the brake assembly of FIG. 1.

Now referring to the drawings, a brake system of the present invention is designated in its entirety by reference numeral 1. As illustrated in FIGS. 1 and 2, the brake system 1 is particularly adapted for braking a drive shaft 3 of an apparatus, such as an inclined conveyor 5, subject to runaway to stop runaway. Conveyor 5 may be of the type used to load heavy materials, such as ore or coal, on barges, train cars, tractor-trailers and the like.

As shown in FIG. 2, the conveyor 5 is driven by a drive motor 7 via the shaft 3. The drive motor 7 may be a three-phase electic motor, for example, of the constant speed type developing approximately 125 H.P. (93 kW) at 1780 revolutions per minute. The shaft 3 includes a fluid coupling 9 so that power is transmitted smoothly through the shaft when the drive motor 7 is turned on and as the load on the conveyor 5 is increased. The shaft 3 is stabilized by a bearing mount 11.

The brake system 1 (FIGS. 3 and 4) generally comprises a brake drum 13 on the shaft 3 and brake shoe means including upper and lower brake shoes 15 and 17 pivotably connected to a framework 19 via a mounting bracket 21 so that the brake shoes may engage with and disengage from the drum. It will be understood that the brake drum 13 and brake shoe means may be, for example, of the type known in the art as a "drum brake" system or a "disc brake" system. Adjustable brake shoe stops 16 and 18 are mounted on the framework 19 to limit movement of the brake shoes 15 and 17, respectively, away from the brake drum 13.

Figure 5:
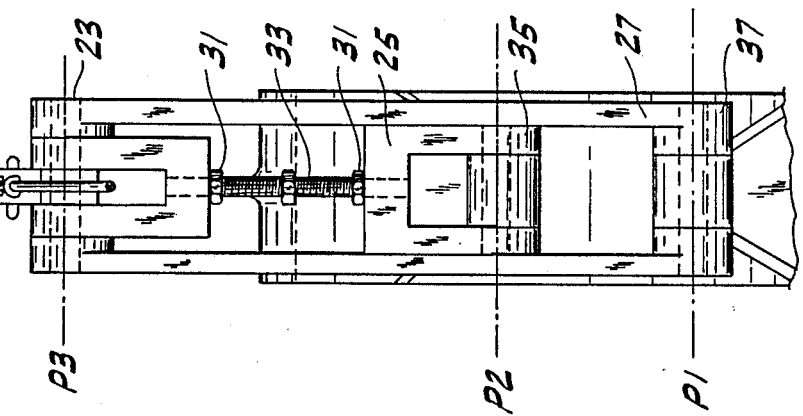
FIG. 5 is an enlarged cross-sectional view along line 5—5 of FIG. 3.
Figure 3:
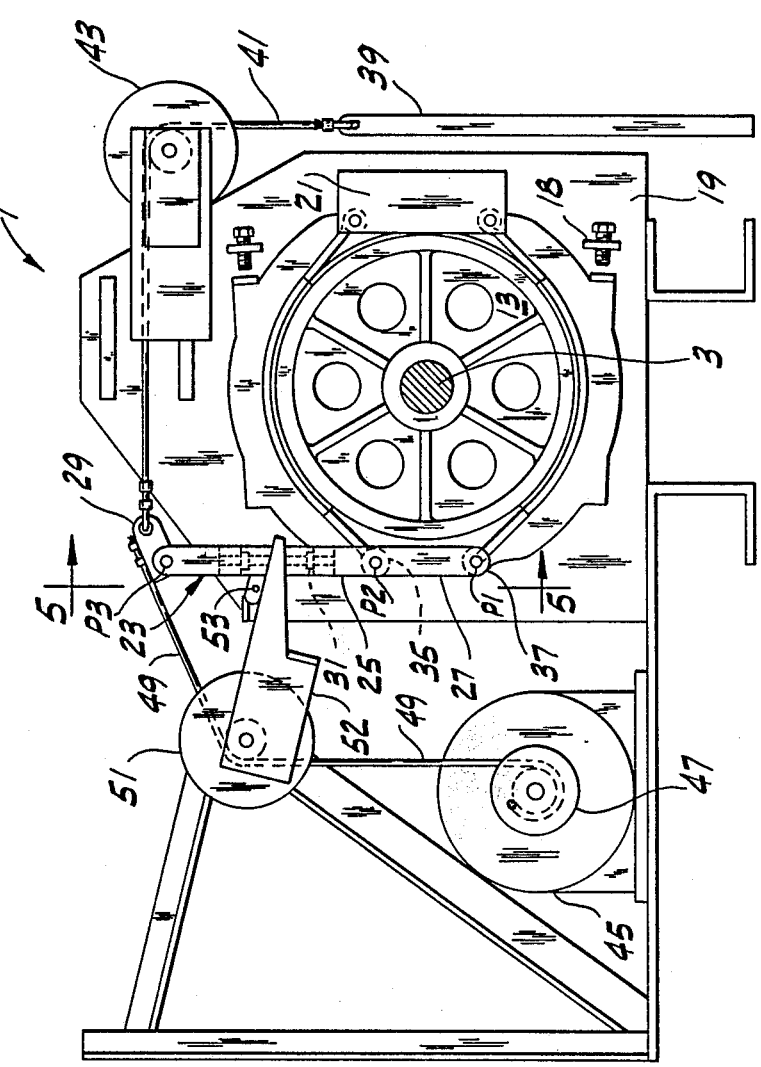
FIG. 3 is a cross-section along line 3—3 of FIG. 2 showing a control member of the brake assembly in a first position.

A control member generally designated 23 is connected to the brake shoes 15 and 17, and is movable in one direction (right as viewed in FIGS. 3 and 4) to a first position (FIG. 3) for applying the brake shoes to the brake drum 13 to stop the conveyor and in the opposite direction (left as viewed in FIGS. 3 and 4) to a second position (FIG. 4) for releasing the brake shoes to allow the shaft 3 to rotate. As shown in FIG. 5, the control member 23 comprises brake levers 25 and 27 pivotably connected at P1 and P2 to the upper and lower brake shoes 15 and 17, respectively. The control member 23 preferably includes a mechanism for adjusting the brake shoe means, specifically for adjusting the pressure exerted by the brake shoes 15 and 17 on the brake drum 13 when the control member is in its braking position (FIG. 3). For example, the pressure may be adjusted by rotating locking nuts 31 and threaded stud 33 to vary the distance between pivot points P1 and P2.

When the brake levers 25 and 27 are moved to their braking position (FIG. 3), their longitudinal axes are disposed in one generally vertical plane and their lower ends 35 and 37, respectively, are held relatively close to one another to force the brake shoes 15 and 17 against the brake drum 13. When the brake levers 25 and 27 are pulled to their release position (FIG. 4), their longitudinal axes are pulled out of the common plane to a skewed position wherein the distance between their lower ends 35 and 37 is greater than in the first position to release the brake shoes 15 and 17 from the brake drum 13.

Means is provided for biasing the control member 23 in the rightward direction as viewed in FIGS. 3 and 4 to its braking position (FIG. 3) for applying the brake shoes 15 and 17 to the brake drum 13. As illustrated, this biasing means comprises a counterweight 39 (e.g., a 100 lbs (45 kg)) counterweight connected by a cable 41 (e.g., ⅜ in. (10 mm) diameter steel cable) to the the upper end of the control member 23. The cable 41 extends vertically upwardly from the upper end of the counterweight 39 over a wheel or pulley 43 mounted on the framework 19, and then horizontally (e.g., leftward in FIGS. 3 and 4) to a connecting link 29 pivoted at P3 to the uppper end of the control member 23. Alternatively, the control member 23 may be biased to its first position (FIG. 3) by a spring-biasing system (not shown).

A torque motor 45 is connected to the control member 23 via a cable drum 47 on the shaft of the torque motor and a cable 49 connected to the drum and to the connecting plate 29 of the control member. By way of example, the torque motor 45 may be a three-phase electric motor developing approximately 75 ft-lbs (100 N-m) torque. Cable 49 extends vertically upwardly from the cable drum 47 over a wheel or pulley 51 rotatable on a pulley mount 52, and then horizontally (e.g., rightward in FIGS. 3 and 4) to the connecting link 29 at the upper end of the control member 23. On energization, the torque motor 45 pulls the cable 49 downwardly and leftwardly to move the control member 23 to its release position (FIG. 4) and holds it there for release of the brake shoes 15 and 17 from the brake drum 13. The control member 23 is released on deenergization of the torque motor 45, allowing the counterweight 39 to pull the control member to its braking position (FIG. 3) for applying the brake shoes 15 an 17 to the brake drum 13.

A limit switch 53 mounted on the framework 19 and wired to the drive motor 7 controls the drive motor. It will be noted in this respect that the limit switch 53 is positioned for engagement by the control member 23 to energize the drive motor 7 when the control member is in its release position (FIG. 4) and for disengagement by the control member to de-energize the motor when the control member moves to its braking position (FIG. 3).

A velocity sensor 55 (FIG. 1) is provided for sensing the velocity of the conveyor belt 5. The velocity sensor 55 is wired to the torque motor 45 to shut off the torque motor if the conveyor 5 exceeds a predetermined velocity (indicating runaway) so that if a conveyor exceeds this velocity, the conveyor will be stopped. This is accomplished, for example, if the velocity sensor 55 is adapted to sense the velocity of one of the conveyor rollers (e.g., roller 56). When the velocity sensor 55 de-energizes the torque motor 45, the counterweight 39 pulls the control member 23 to its braking position to apply the brakes. It will be understood that the velocity sensor 55 constitutes one embodiment of means responsive to runaway of the apparatus for de-energizing the torque motor.

To start the conveyer system, a switch (not shown) is turned on to energize the torque motor 45, causing the control member 23 to be pulled leftwardly in FIGS. 3 and 4 against the limit switch 53 (i.e., to the release position shown in FIG. 4) and raising the counterweight 39. The brake sheos 15 and 17 are released from the brake drum 13 as the control member 23 moves toward its release position, and the drive motor 7 is energized when the control member 23 engages the limit switch 53. Preferably, the brake shoes 15, 17 are released from the brake drum 13 almost simultaneously with energization of the driver motor 7 so that there is no more than a very small delay between brake release the and energization of the drive motor. This may be accomplished by appropriately adjusting the length of the brake lever 25 of the control member 23.

The torque motor 45 will hold the control member against the limit switch 53 and the brake shoes 15, 17 against the brake stops 16 and 18 so long as the velocity sensor 55 detects the conveyor 5 moving at normal velocity. At this velocity the conveyor 5 will normally be loading ore or coal on a barge, etc. However, if the conveyor 5 accelerates uncontrollably, as would happen if the conveyor belt breaks, for example, roller 56 will "freewheel" and the velocity sensor 55 will shut off the torque motor 45. This allows the counterweight 39 to drop, thereby pulling the control member 23 rightwardly in FIGS. 3 and 4 to lock the brakes and stop the conveyor 5. When the control member releases the limit switch 53, the drive motor 7 is deenergized.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A brake system for braking a shaft of an apparatus subject to runaway to stop runaway, said system comprising:

a brake drum on the shaft;

brake shoe means engageable with and disengageable from the drum;

a control member connected to the brake shoe means movable in one direction to a first position for applying the brake shoe means and in the opposite direction to a second position for releasing the brake shoe means;

means biasing the control member in said one direction to its said first position for applying the brake shoe means;

a torque motor connected to said control member for moving the control member on energization of the torque motor to said second position and holding it there for release of the brake shoe means;

means responsive to runaway of the apparatus for de-energizing the torque motor, the control member being released on de-energization of the torque motor for applying the brake shoe means to its drum; and a drive motor for driving said shaft and a limit switch for controlling operation of the drive motor, said control member being engageable with the limit switch when the control member is in its said second position to energize the drive motor to drive the shaft, and said control member being disengageable from said limit switch as it moves toward its said first position to deenergize the drive motor prior to application of the brake shoes to the brake drum.

2. A brake system as set forth in claim 1 wherein the torque motor is an electric motor connected to said control member via a cable drum on the shaft of the torque motor and a cable connected to the drum and to the control member.

3. A brake system as set forth in claim 1 wherein the biasing means comprises a weight connected by a cable to said control member.

4. A brake system as set forth in claim 3 wherein the torque motor is an electric motor connected to said control member via a cable drum on the shaft of the torque motor and a cable connected to the drum and to the control member.

5. A brake system as set forth in claim 1 wherein said apparatus comprises an inclined conveyor, a drive motor for driving the conveyor via said shaft and a velocity sensor for sensing the velocity of the conveyor to shut off the torque motor if the conveyor exceeds a predetermined velocity to stop the conveyor.

6. In combination with an apparatus subject to runaway, the apparatus having a shaft for driving the apparatus; a brake system for braking the shaft to stop runaway of the apparatus, said system comprising:

a brake drum on the shaft;

brake shoe means engageable with and disengageable from the drum;

a control member connected to the brake shoe means movable in one direction to a first position for applying the brake shoe means and in the opposite direction to a second position for releasing the brake shoe means;

means biasing the control member in said one direction to its said first position for applying the brake shoe means;

a torque motor connected to said control member for moving the control member on energization of the torque motor to said second position and holding it there for release of the brake shoe means;

means responsive to runaway of the apparatus for deenergizing the torque motor, the control member being released on de-energization of the torque motor for applying the brake shoe means to its drum; and a drive motor for driving said shaft and a limit switch for controlling operation of the drive motor, said control member benig engageable with the limit switch when the control member is in its said second position to energize the drive motor to drive the shaft, and said control member being disengageable from said limit switch as it moves toward its said first position to deenergize the drive motor prior to application of the brake shoes to the brake drum.

7. A combination as set forth in claim 6 wherein the torque motor is an electric motor connected to said control mmeber via a cable drum on the shaft of the torque motor and a cable connected to the drum and to the control member.

8. A combination as set forth in claim 6 wherein the biasing means comprises a weight connected by a cable to said control member.

9. A combination as set forth in claim 8 wherein the torque motor is connected to said control member via a cable drum on the shaft of the torque motor and a cable connected to the drum and to the control member.

10. A combination as set forth in claim 6 wherein said apparatus comprises an inclined conveyor, a drive motor for driving the conveyor via said shaft and a velocity sensor for sensing the velocity of the conveyor to shut off the torque motor if the conveyor exceeds a predetermined velocity to stop the conveyor.

* * * * *